(12) United States Patent
Kodama

(10) Patent No.: US 6,944,789 B2
(45) Date of Patent: Sep. 13, 2005

(54) METHOD AND APPARATUS FOR DATA BACKUP AND RECOVERY

(75) Inventor: Shoji Kodama, San Jose, CA (US)

(73) Assignee: Hitachi, Ltd., Tokyo (JP)

(*) Notice: Subject to any disclaimer, the term of this patent is extended or adjusted under 35 U.S.C. 154(b) by 475 days.

(21) Appl. No.: 10/170,157

(22) Filed: Jun. 11, 2002

(65) Prior Publication Data

US 2003/0229819 A1 Dec. 11, 2003

(51) Int. Cl.[7] .............................................. G06F 11/00
(52) U.S. Cl. ............................................................ 714/5
(58) Field of Search ............................................. 714/6

(56) References Cited

U.S. PATENT DOCUMENTS

| | | |
|---|---|---|
| 5,430,871 A | 7/1995 | Jamoussi et al. |
| 5,771,354 A | 6/1998 | Crawford |
| 5,878,434 A | 3/1999 | Draper et al. |
| 5,901,228 A | 5/1999 | Crawford |
| 5,991,771 A | 11/1999 | Falls et al. |
| 6,029,231 A | 2/2000 | Blumenau |
| 6,163,856 A | 12/2000 | Dion et al. |
| 6,192,365 B1 | 2/2001 | Draper et al. |
| 6,496,908 B1 * | 12/2002 | Kamvysselis et al. ...... 711/162 |
| 6,665,780 B1 * | 12/2003 | Bradley ...................... 711/162 |
| 2002/0059505 A1 * | 5/2002 | St. Pierre et al. ........... 711/162 |
| 2003/0191921 A1 * | 10/2003 | Hauck et al. ................ 711/202 |
| 2004/0098547 A1 * | 5/2004 | Ofek et al. .................. 711/162 |

OTHER PUBLICATIONS

Briefcase Data Transfer System and Icon Interface, IBM Technical Disclosure Bulletin, Apr. 1994, pp 447–448.

* cited by examiner

Primary Examiner—Bryce P. Bonzo
(74) Attorney, Agent, or Firm—Townsend and Townsend and Crew LLP

(57) ABSTRACT

Data backup and recovery of a personal computer (PC) involves determining an operating situation of the PC in terms of availability of internal and remote disk drives. Data I/O is made with the internal and/or remote disk drives according to the operating situation. Corresponding updates are made to a bitmap to coordinate backing up data to and recovering data from the remote disk drive.

10 Claims, 15 Drawing Sheets

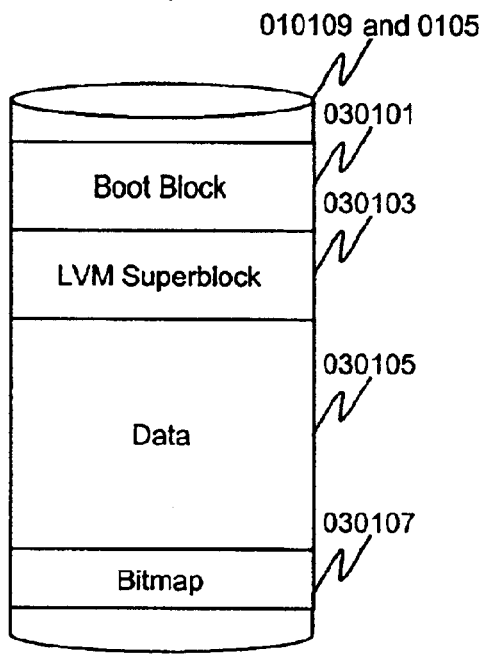
Fig 3
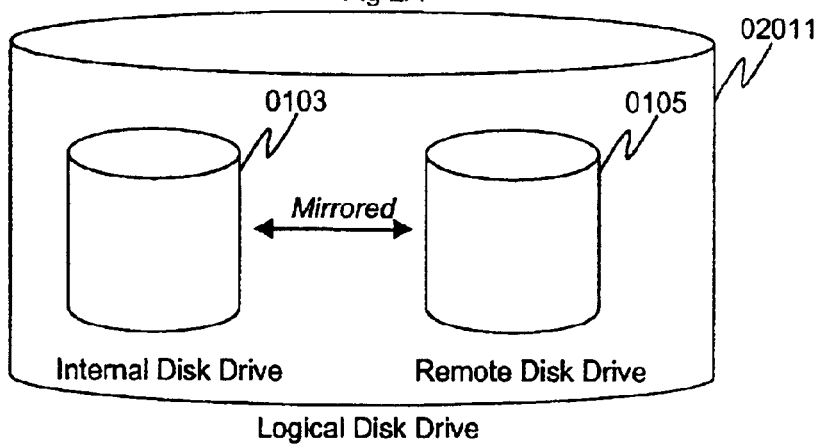
Fig 5
Fig 2A

Fig 4

LVM Superblock 030103

| | | |
|---|---|---|
| LVM Name | lvm01 | 040101 |
| LVM Mode | Normal / Recovery | 040103 |
| Internal Disk | ID of disk drive | 040105 |
| Remote Disk | ID of disk drive | 040107 |

Fig 6

LVM Status 0601

Office / Home / Recovery / Emergency

Fig 7

Boot Order 0701

| 070101 | 070103 |
|---|---|
| 1 | Remote disk drive |
| 2 | Internal disk drive |
| 3 | Floppy disk drive |
| 4 | CD-ROM drive |

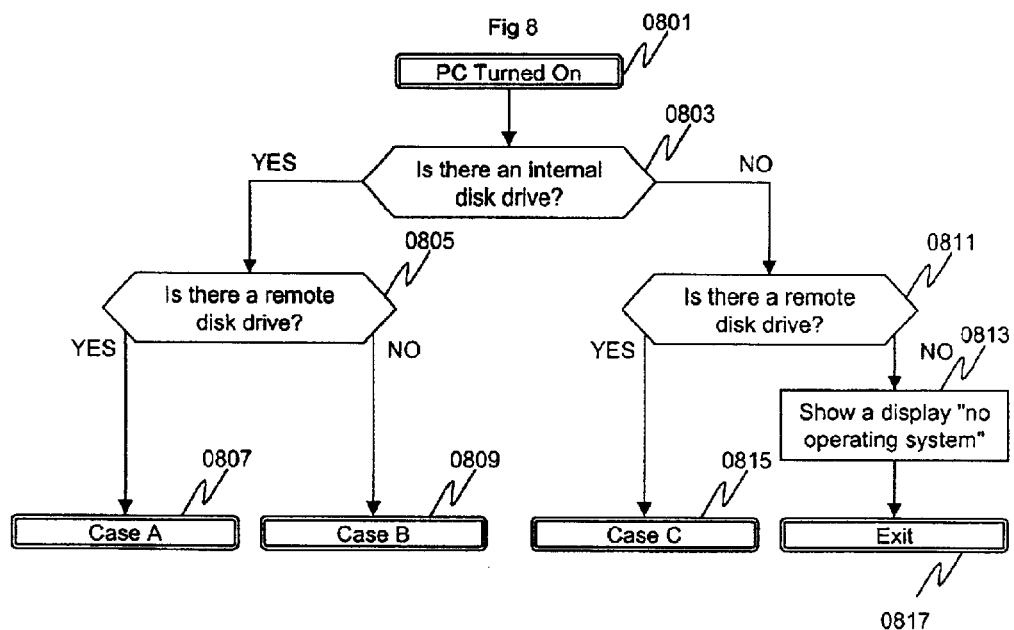

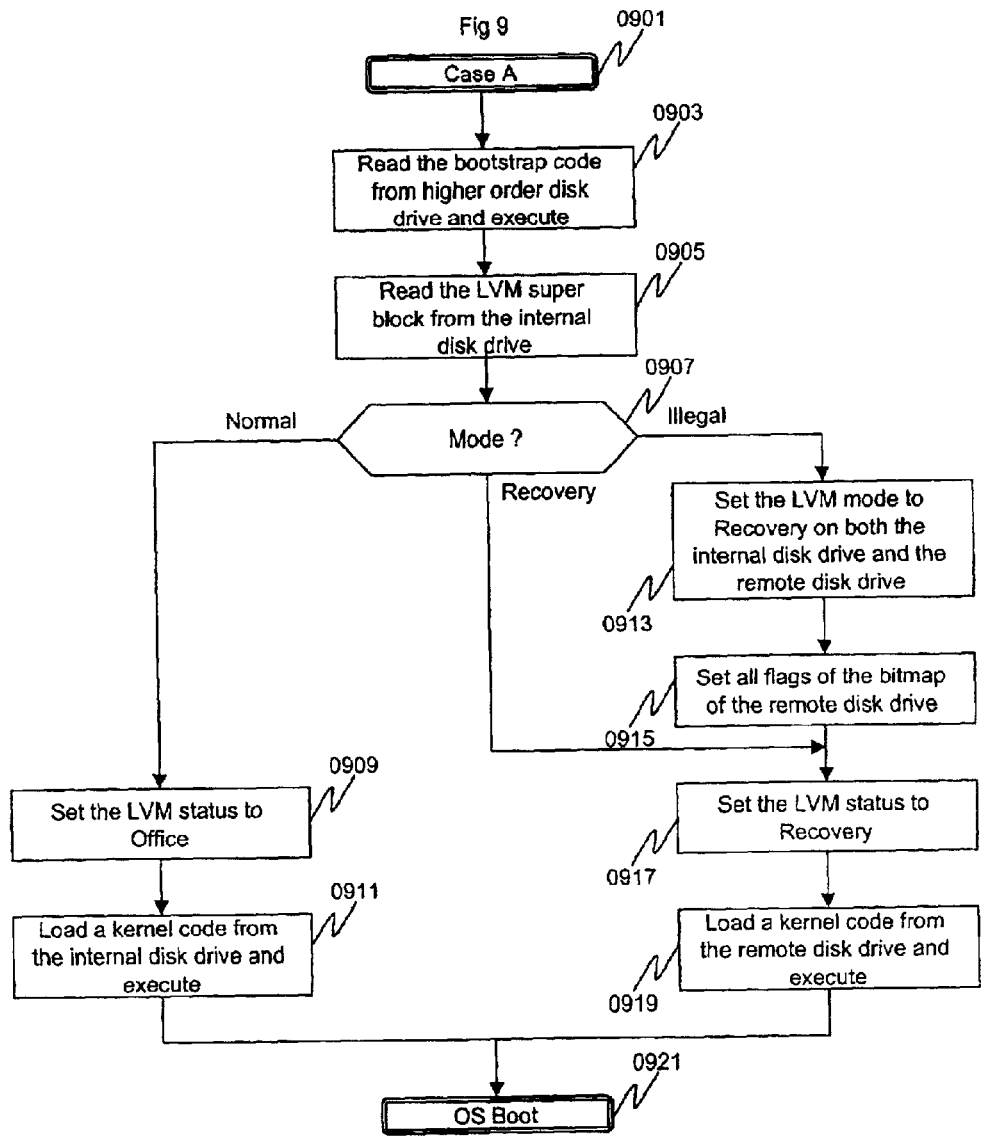

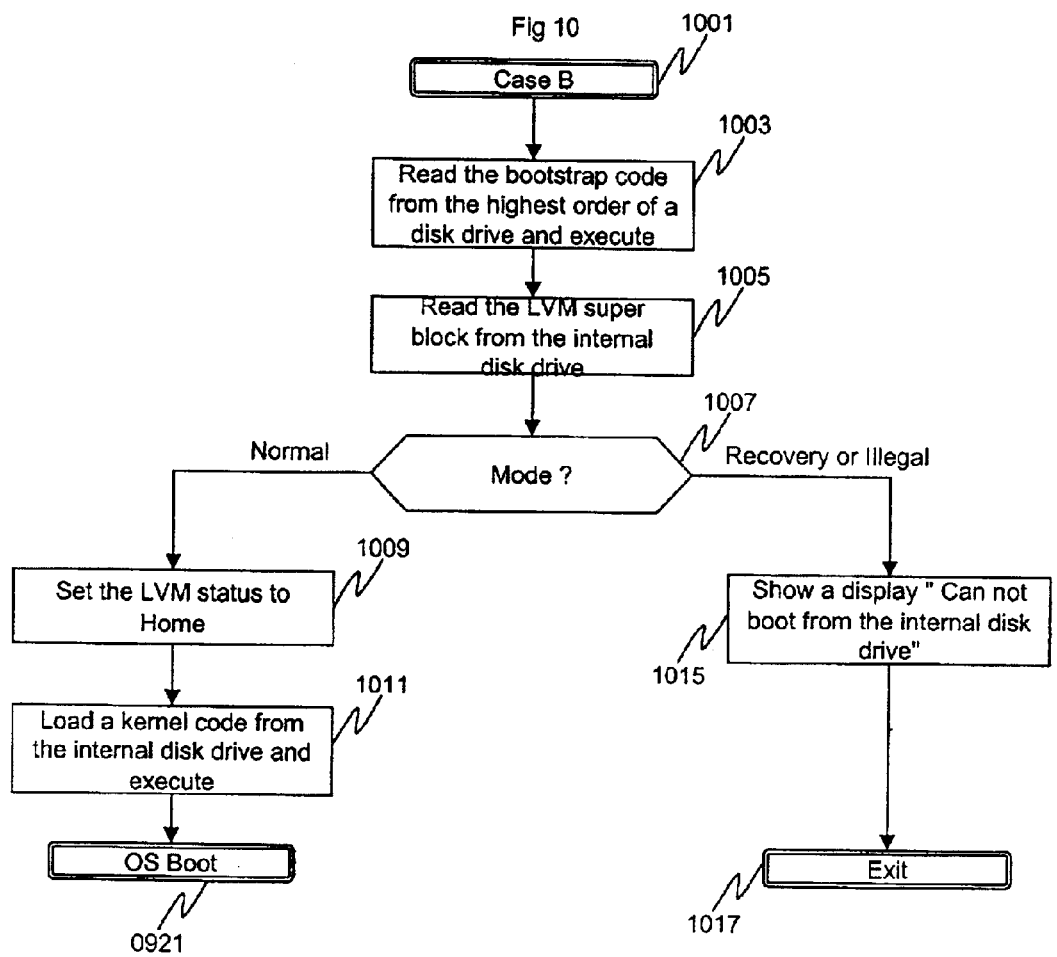

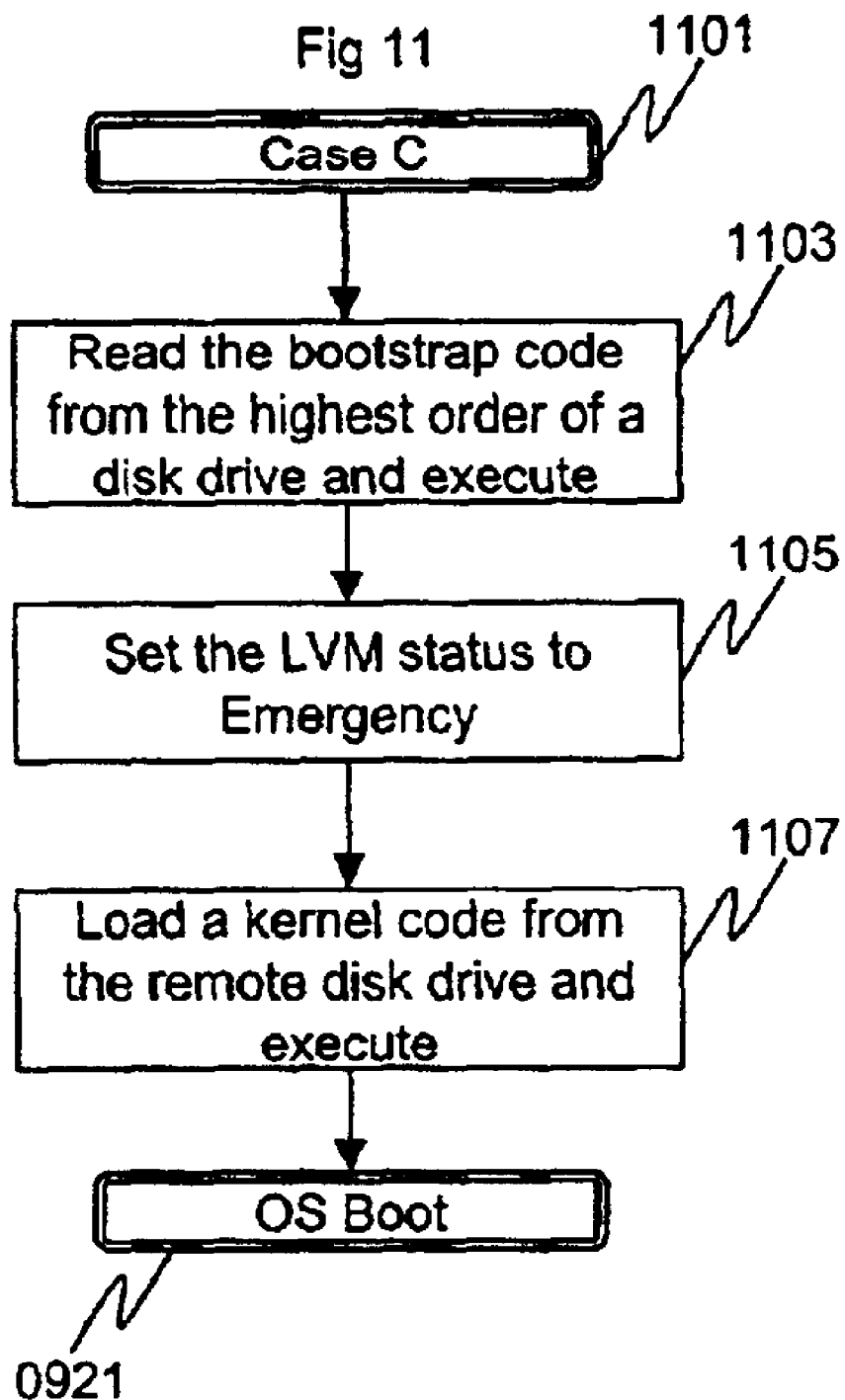

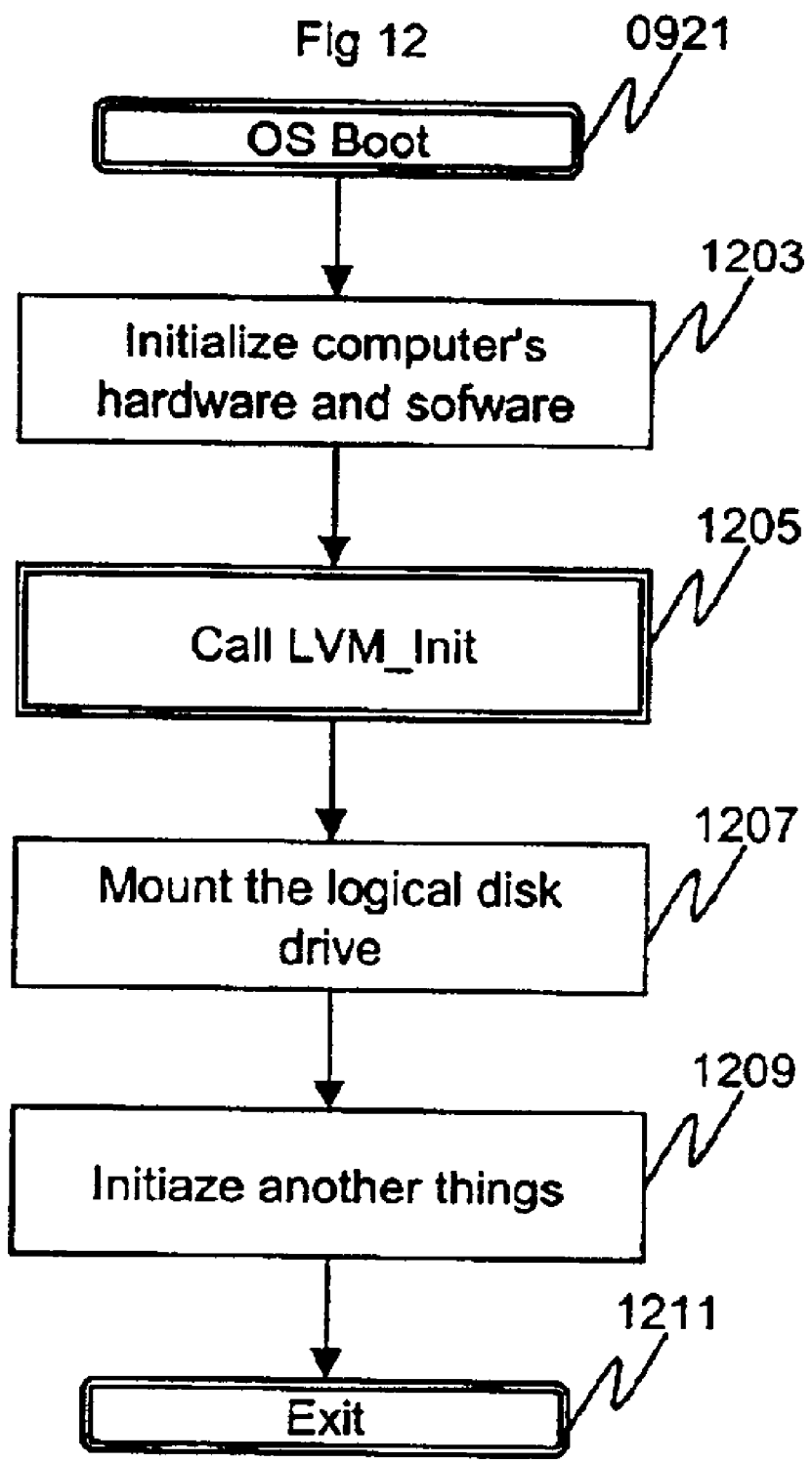

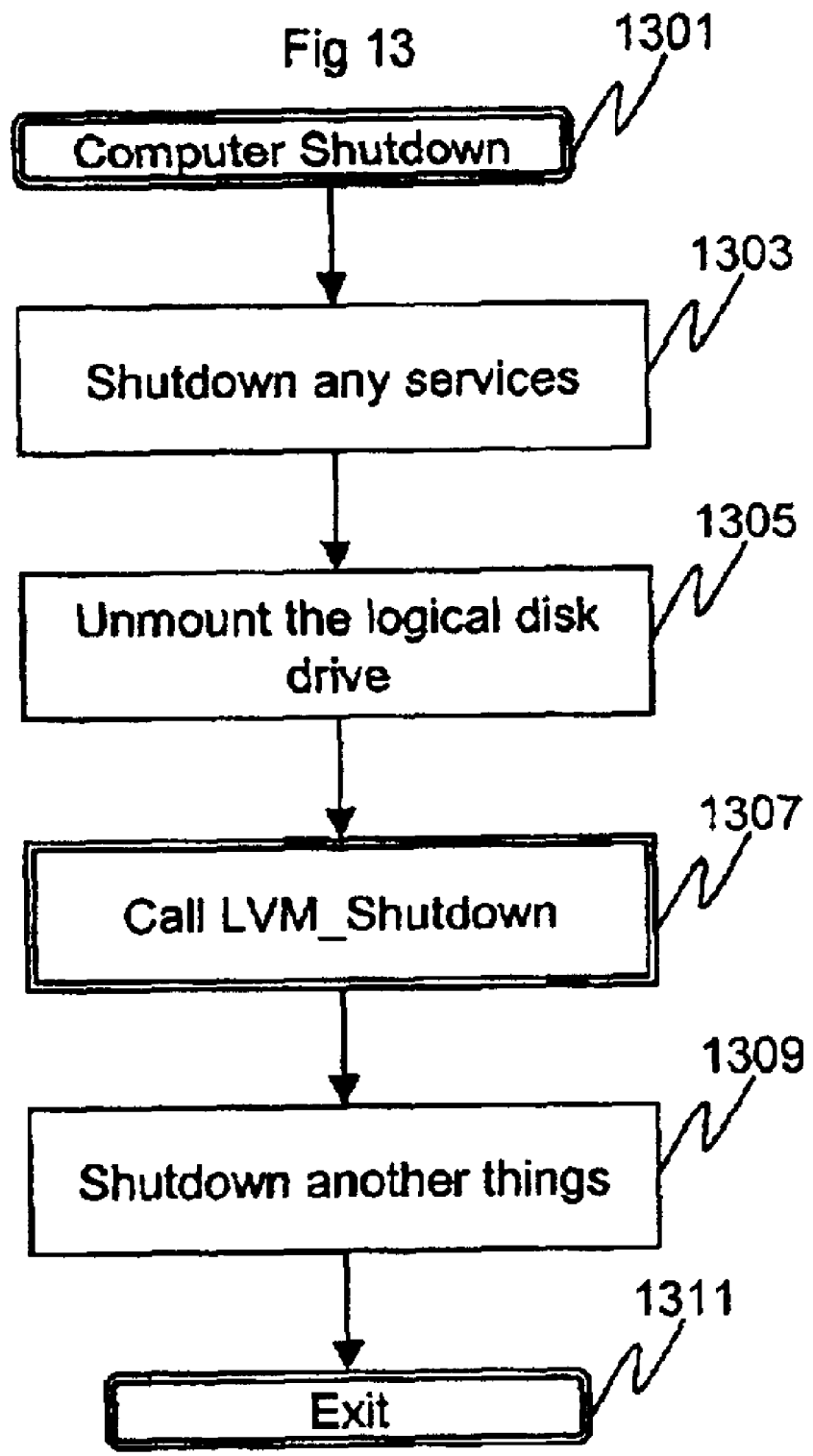

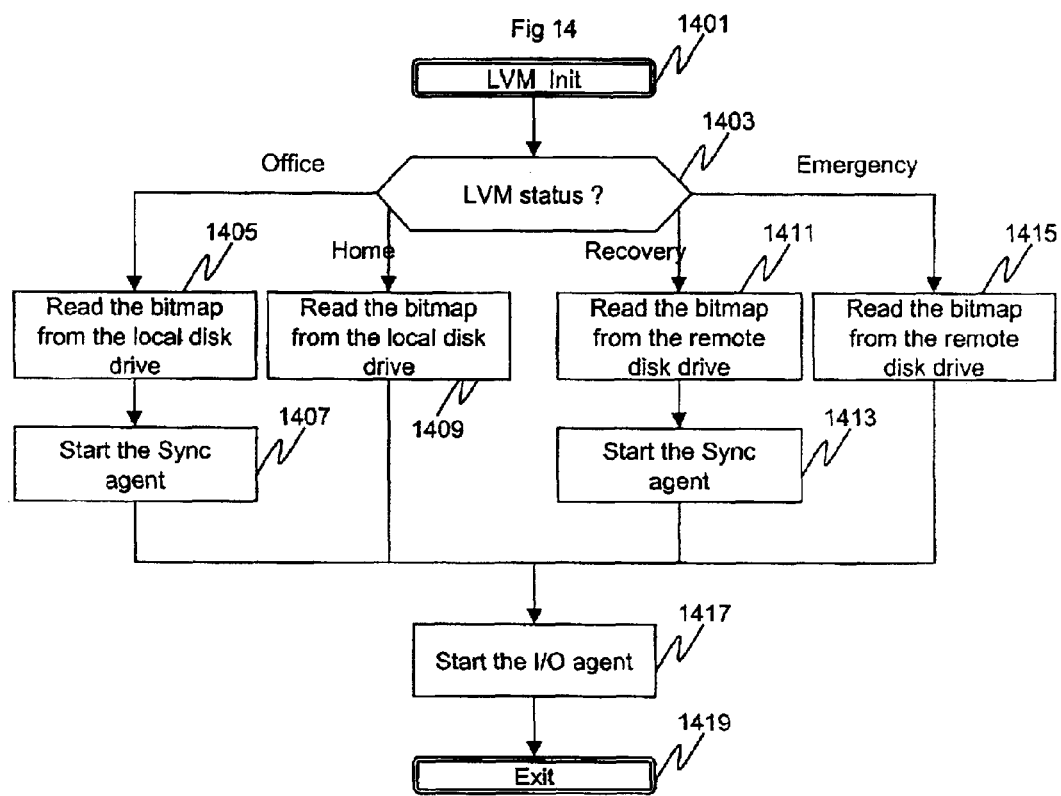

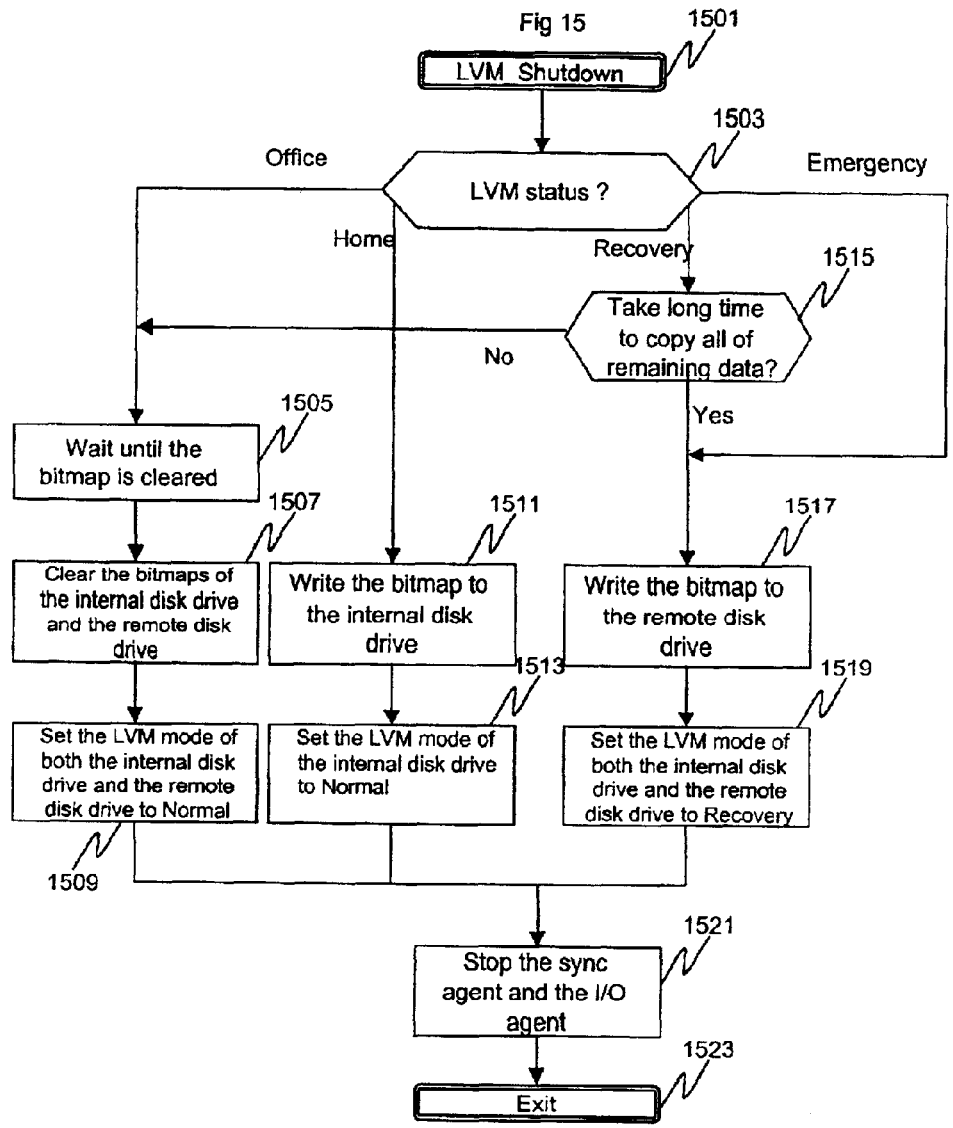

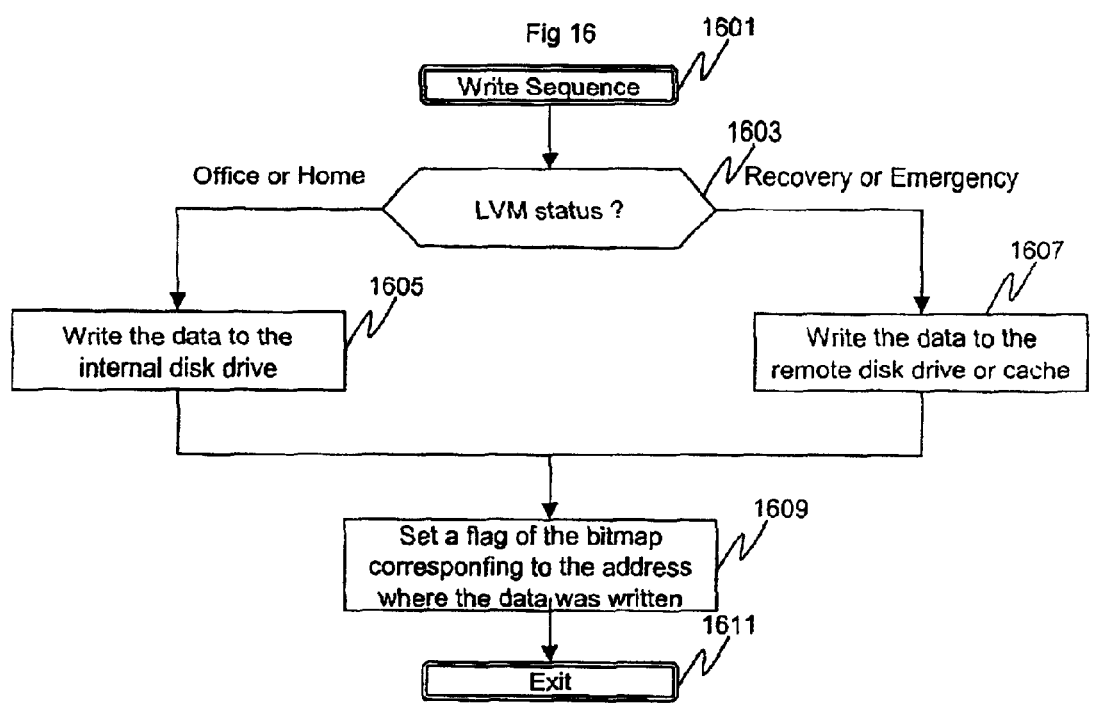

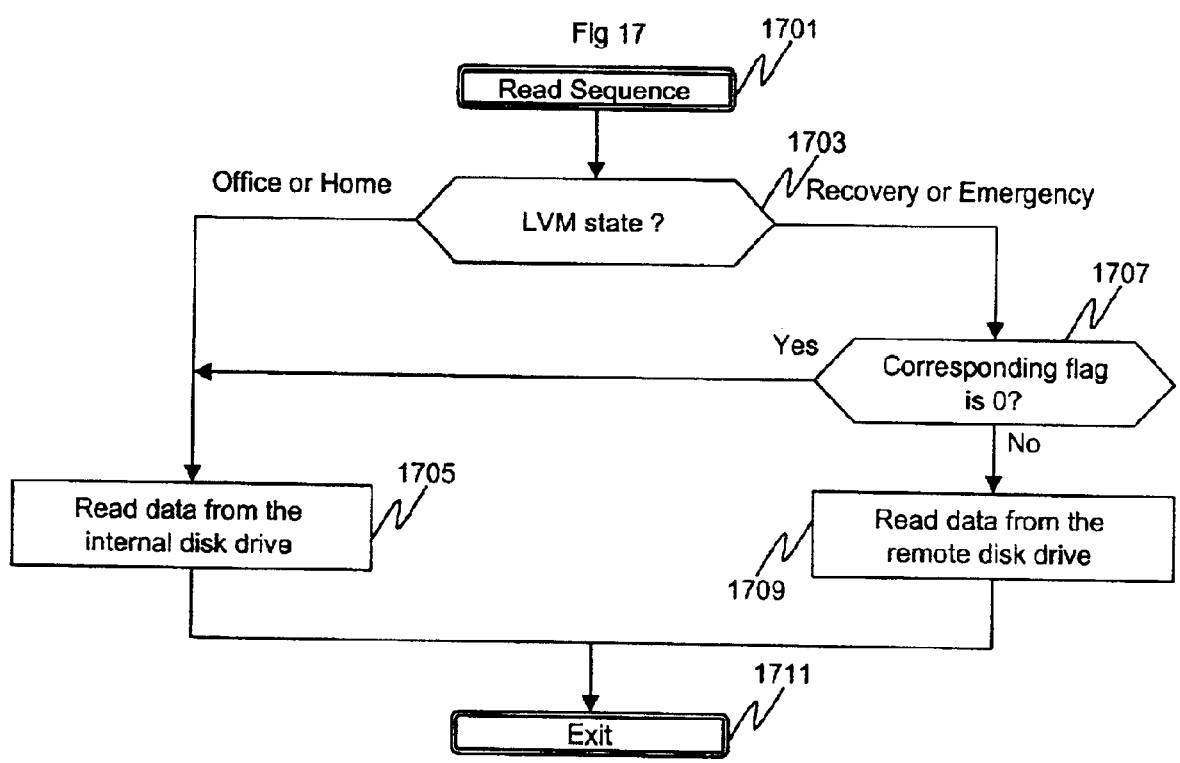

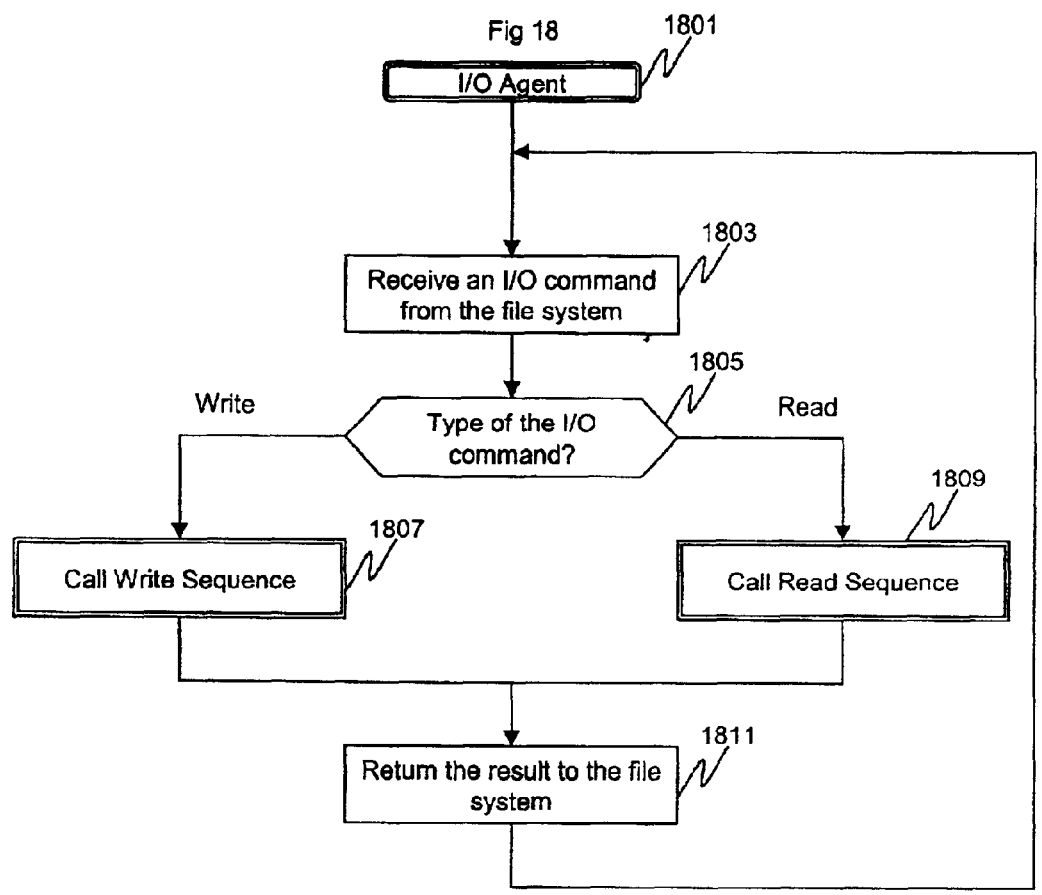

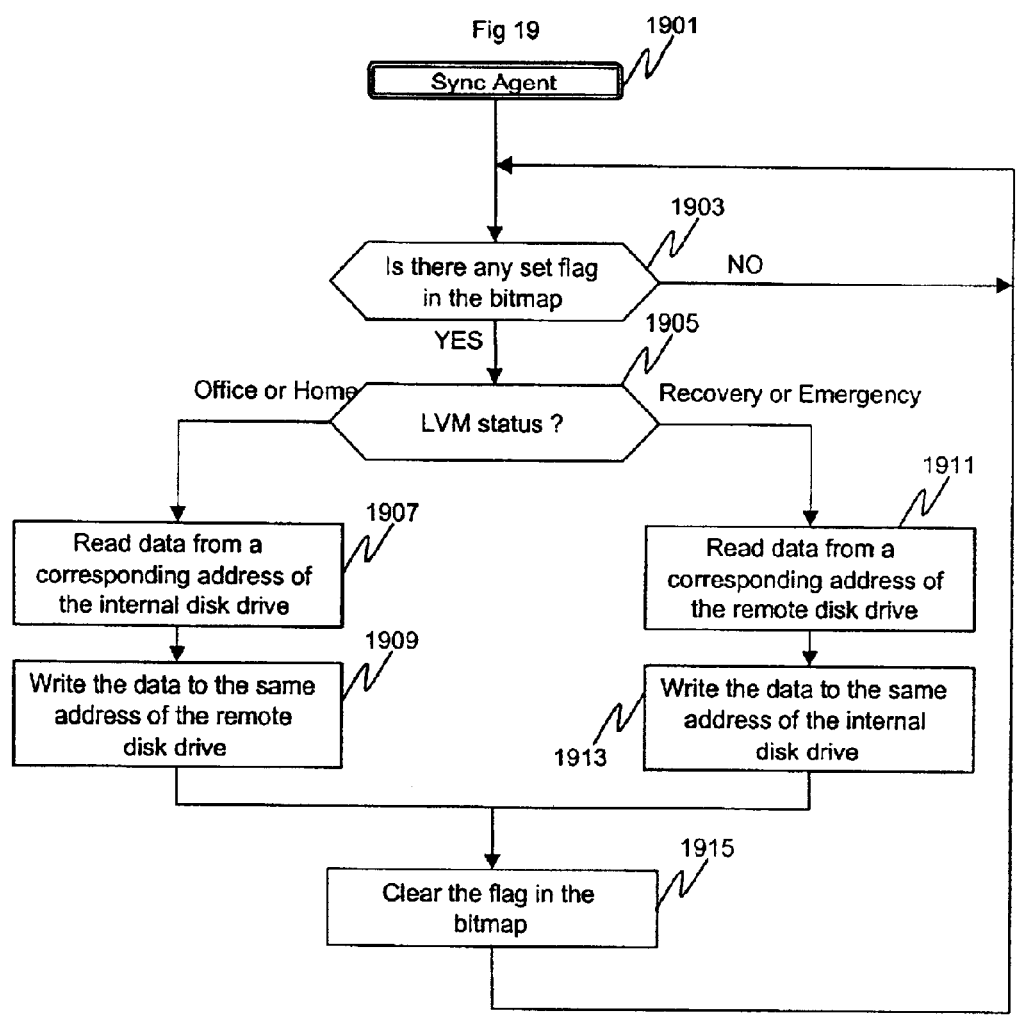

METHOD AND APPARATUS FOR DATA BACKUP AND RECOVERY

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

Personal computers (PC) have long been deployed as an essential tool in all facets of daily life. It goes without saying that almost every business operation relies on PCs. Personal home use is almost as ubiquitous, for Internet access and for work purposes.

Generally the PC comprises a "motherboard" having a central processor chip and a host of supporting circuitry such as random access memory (RAM), memory controller, graphics controller, and so on. A variety of data storage units are typically included such as an internal hard disk drive, a compact disk (CD) reader or reader/writer unit, and a floppy drive. The "brains" behind the machine are the various software components that execute on the PC. For example, an important software component is the operating system (OS) which in turn comprises a variety of program code components.

Because of the mechanical load imposed on a hard disk drive, it is typically one of the first components in the PC to break down. A mechanical failure in a hard disk drive typically results in destruction of the data storage media. This situation is referred to variously as a disk drive crash, a head crash (because the read/write head has impacted on the surface of the storage medium), and so on. In the case of a disk drive crash, there is no method to recover the data in the crashed disk, if the data had not been previously backed up. So, users who do not want to be in such a situation backup their data frequently, either manually (e.g., in a home environment) or with the assistance of software.

Redundant arrays of inexpensive disks (RAID) provide hardware solutions for data recovery. The RAID standard provides many levels of backup methodologies, each offering different performance and data recovery capabilities. RAID1 is a level in which data is replicated from one disk drive to another disk drive (referred as a backup disk drive) at a block level instead of a file level. An application sees just one logical disk drive. However, the logical drive comprises two hard disk drives with a RAID1 configuration referred to as mirroring. When the application issues a write command to the logical disk drive, the command is issued to both of the underlying disk drives so that both disk drives will always have the same data. Thus, even if one of the disk drives crashes, the data is still available on the surviving disk drive.

Implementations of RAID1 are generally located in a disk controller card and include a logical volume manager (LVM) and a RAID disk array. The disk controller card can be a PCI or PC card, which is inserted to the PC and connects to the two hard disk drives. This card has a processor on it to process I/O commands issued by a CPU of the PC. The LVM is a software module in the OS. The LVM component "sees" both disk drives and provides the I/O routines (system calls) for doing disk I/O. The higher level applications programs see just one logical disk drive. The RAID disk array is an external box, which has a lot of disk drives in it and has a disk controller to process I/O commands from one or more PCs. The RAID disk array and the PCs can be connected via a SCSI interface or a Fibre Channel interface, or the like. However, RAID systems are typically not portable. Thus, a conventional RAID solution is not appropriate for portable computers, e.g., laptop computers.

SUMMARY OF THE INVENTION

In a computing system, a backup and restore procedure includes identifying a mode of operation and an operating status to determine whether to write and read information from an internal disk or a remote disk. A runtime bitmap indicates whether a corresponding disk block to be copied from one disk drive to the other, depending on the operating status of the computing system. A shutdown procedure includes copying blocks of date according to the runtime bitmap from the remote disk drive to the internal disk drive, or simply copying the bitmap to the remote disk drive, depending on the operating status of the computing system.

BRIEF DESCRIPTION OF THE DRAWINGS

FIGS. 2 and 2A show high level block diagrams of hardware and software components of a PC system in accordance with an embodiment of the present invention;

FIG. 3 shows schematically the data organization of a disk drive according to an embodiment of the present invention;

FIGS. 4–6 show various data tables used by the LVM software component in accordance with a particular implementation of an embodiment of the invention;

FIG. 7 shows a boot order table;

FIG. 8 illustrates the various boot up situations;

FIGS. 9–11 illustrate high level boot processing for the situations shown in FIG. 8;

FIG. 12 shows at a high level the processing of a PC OS boot sequence in accordance with an embodiment of the present invention;

FIG. 13 shows at a high level the shutdown sequence of a PC OS in accordance with an embodiment of the present invention;

FIG. 14 shows a high level flow chart of an LVM initialization sequence in accordance with an embodiment of the present invention;

FIG. 15 shows a high level flow chart of an LVM shutdown sequence in accordance with an embodiment of the present invention;

FIGS. 16 and 17 show high level processing of the I/O agent daemon in accordance with an embodiment of the present invention;

FIG. 18 shows I/O request processing; and

FIG. 19 shows sync agent daemon processing in accordance with an embodiment of the present invention.

DESCRIPTION OF THE SPECIFIC EMBODIMENTS

Figure 1:
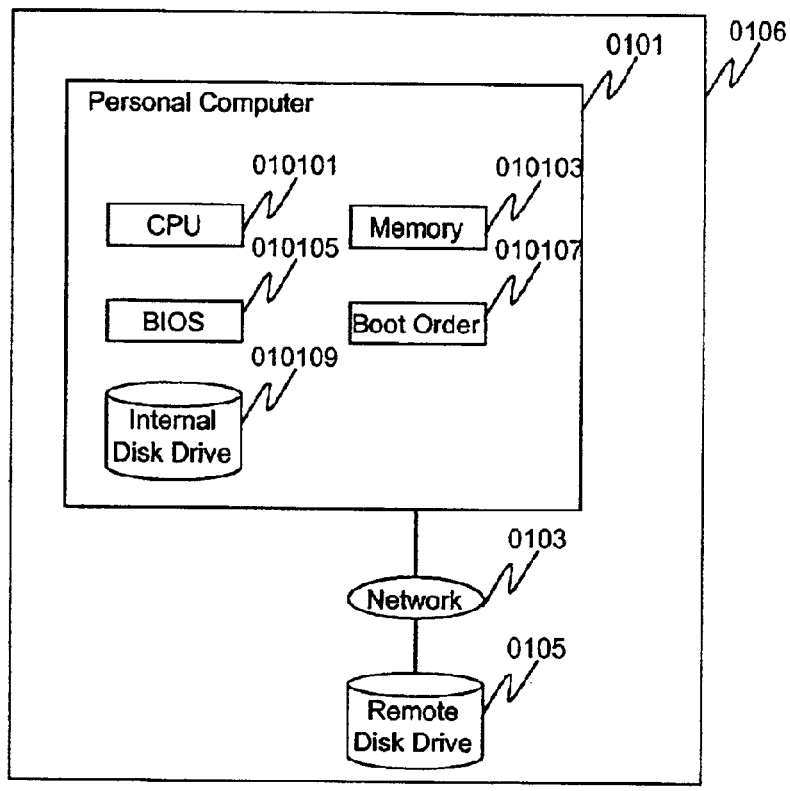
FIG. 1 shows a high level system block diagram of an implementation of a PC system in accordance with an embodiment of the present invention.

FIG. 1 shows a generalized block diagram of an embodiment of a data backup and recovery system according to the invention. The system 0106 includes a personal computer (PC) 0101 and a remote disk drive system 0105 that is accessible via a network 0103. Examples of a network include an Ethernet and a fibre channel. The iSCSI protocol can be used for transferring data between the PC and the remote disk drive via the Ethernet and the SCSI/FC protocol via the fibre channel.

The PC 0101 typically comprises a CPU 010101 and a memory component 010103, such as a RAM, and a data storage device such as internal disk drive 010109. In a particular implementation, the PC includes a basic I/O system (BIOS) 010105 that is typically stored in firmware. The BIOS includes a Boot Order Table 010107 which specifies an ordering of data storage devices. A boot program is obtained by searching each data storage device in the order given by the Boot Order Table. The CPU and the memory are major components used in typical computers to run programs like an operating system (OS). The BIOS is the first program that is executed when the PC is turned on. The purpose of the BIOS is to read the boot program into the memory and to transfer execution to the boot code. The boot program in turn loads program suitable for operating the PC, namely, the operating system. The internal disk drive is connected to the PC via an appropriate data I/O connection such as an IDE interface, a SCSI interface and the like.

Figure 2:
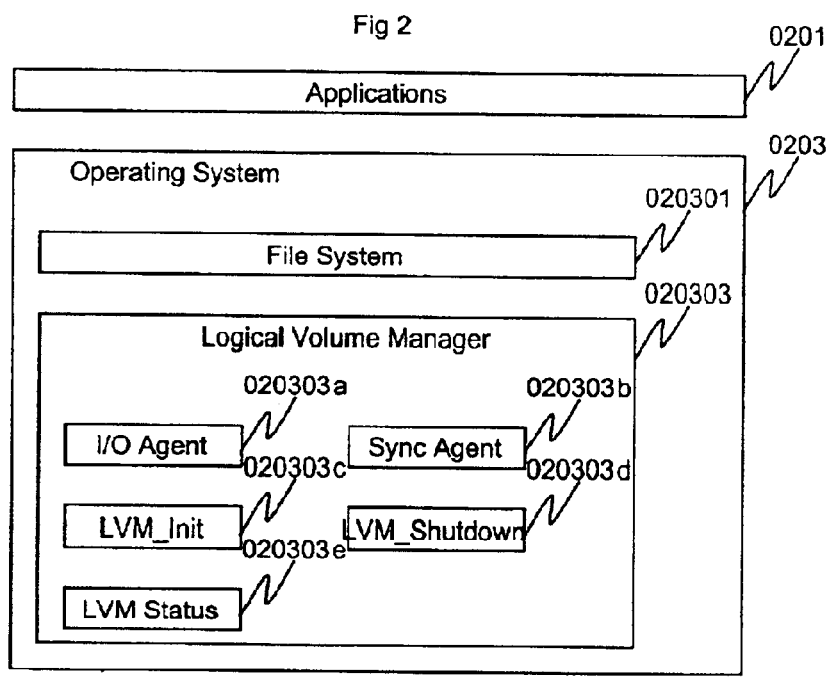

FIG. 2 shows typical software that runs (executes) on the PC. An operating system 0203 provides services to execute applications 0201. The services include memory management, device management, process scheduling, and so on. In accordance with the present invention, a logical volume manager 020303 (LVM) is incorporated as a data I/O component of the OS and provides data storage device I/O services.

Applications that are running on the operating system use an interface of a file system 020301 to exchange (read and write) data with the data storage systems. The file system is another component of the operating system and provides file-level I/O services to the applications. The LVM runs under the file system and provides the file system with a logical view of the local disk drive and of the remote disk drive. The file system makes block-level I/O requests to the logical disk drive.

The components comprising the LVM 020303 include an I/O agent daemon 020303*a*, a sync agent daemon 020303*b*, an LVM_Init procedure 020303*c*, an LVM_Shutdown procedure 020303*d*, and an LVM status data store 020303*e*. The I/O agent processes a request from the file system 020301. The sync agent copies data from the internal disk drive to the remote disk drive in a normal operation (discussed below) and vice versa in a recovery operation (also discussed below). The LVM_Init procedure executes during the boot up process. The LVM_Shutdown procedure is called when the operating system shuts down. The LVM status determines the operational state of the LVM.

The logical view of the disk drives is referred to as a logical disk drive 02011, as shown in FIG. 2A. The logical disk drive comprises the internal disk drive 0103 and the remote disk drive 0105. The LVM software component 020303 is responsible for maintaining the same data on both disk drives. The file system 020301 does not distinguish the two disk drives. It issues I/O commands to the logical disk drive and the LVM processes the commands. How the LVM treats the I/O commands is described later.

FIG. 3 illustrates a logical division of the disk space of the local drive (010109, FIG. 1) and remote drive (0101050). The disk space of both the internal disk drive and the remote disk drive is partitioned into four areas. In accordance with an embodiment of the present invention, there is a boot block area 030101, an LVM superblock area 030103, a data area 030105, and a bitmap area 030107. The data area 030105 constitutes the bulk of the disk space and is used to store user data files and such.

The boot area 030101 has bootstrap code for reading the OS from a disk and executing the OS program. The BIOS of the PC reads in the bootstrap code ("bootstrap loader") when the PC has been turned on and executes the code. The bootstrap code then reads an operating system program from a disk drive and executes it. This process is generally referred to as bootstrapping. The operating system program comprises many components, including a kernel which is the core program of the operating system.

The LVM superblock 030103 has information related to a configuration of the LVM. FIG. 4 shows detail of the LVM superblock. The LVM superblock contains four kinds of information: an LVM name 040101, an LVM mode 040103, an internal disk 040105 and an external disk 040107. The LVM name is a string of characters to identify the logical disk drive.

The LVM mode takes one of two modes, Normal and Recovery. In Normal mode, the internal disk drive contains the most current data. During LVM operation in Normal mode, the LVM copies data from the internal disk drive to the remote disk drive. In Recovery mode, the remote disk drive has the latest data, and so the LVM copies data from the remote drive to the internal disk drive. The Recovery mode is indicative of a situation where the internal drive is a new drive, or otherwise contains data that is no longer current.

The internal disk field 040105 and the remote disk field 040107 each shows which disk drive is being used as an original disk drive and which disk drive is used as a replication of the original disk drive. The disk drive whose identifier is stored in the internal disk field is used as an original. Similarly, the disk drive whose identifier is stored in the remote disk field is used as a replication disk. A disk drive can be identified by several ways, for example, by its serial number or serial code.

The bitmap area 030107 is a map having an entry corresponding to each block in the internal drive 010109. The remote drive 010105 also contains a similar bitmap. The entries of the bitmap (block map) stored in the internal disk drive are used to indicate that their corresponding blocks had changed during a time when the remote disk drive was not available for mirroring. The entries of the bitmap (block map) stored in the remote disk drive are used to indicate that their corresponding blocks have not yet been copied to the internal disk drive. These uses of the bitmaps will be farther discussed below.

FIG. 5 shows an example of an implementation of a bitmap 0501. The bitmap has block numbers 050010 and flags 050103 associated with the block numbers. A block is a unit of data that is handled by the LVM 020303. For example, suppose a disk drive has a capacity of one Gbytes ($2^{30}$ bytes). If the LVM handles data in blocks of 1 Mbytes ($2^{20}$ bytes) each, then the disk drive will comprise 1 Kblocks ($2^{10}$ blocks). The LVM uses a block number to access each block in the disk drive. The bitmap has 1024 entries in it. The flag field indicates in the general sense whether the corresponding block has been copied to another disk. Purely as convention, a value of "1" indicates the block has not been copied, while a "0" indicates the block has been copied. As mentioned above, the specific meaning will depend on an operating mode of the LVM. As will be explained below, if the LVM mode is Normal, then data is copied from the internal disk drive to the remote disk drive. If the LVM mode is Recovery, then the data is copied from the remote disk drive to the internal disk drive.

FIG. 6 shows an LVM status data field 0601. The LVM status is used to indicate the "operating situation" of the PC. In accordance with a particular embodiment of the invention, four operating situations are considered: OFFICE, HOME, RECOVERY, and EMERGENCY.

The LVM can operate in an OFFICE state of operation. In this operating situation, the internal disk drive 010109 (FIG. 1) of the PC is operational, and contains the most current data. Also, in this operating situation, the remote disk drive 010105 is accessible. For example, as the name implies, this might be an office situation where a backup server is provided, so that any changes on the internal disk drive are copied to a remote disk drive on the backup server. Furthermore, any changes made while the PC was disconnected from the backup server (e.g., work performed at home) are backed up to the remote disk drive. As will be explained, the bitmap, in this state, indicates those blocks on the internal disk drive that have not been copied to the remote drive.

The LVM can operate in a HOME state of operation. In this operating state, the PC has access only to the internal disk drive, the remote disk drive being unavailable. As the name implies, this might be a situation in which the PC is being used at home or some place where the remote disk drive is unavailable. In this operating state, there is no data copy between the internal disk drive and the remote disk drive. The bitmap stored on the internal drive indicates which blocks have been modified, but not yet copied to the remote disk drive.

The LVM can operate in a RECOVERY state of operation. In this operating state, the PC has access to both the internal disk drive and to the remote disk drive, but the data in the remote disk drive is more current than data contained on the internal disk drive. A scenario of this operating state might be that the internal disk drive was replaced, in which case the remote disk drive has the backed up data. Another scenario might be one where the PC was turned during a copy back operation of data from the remote disk drive to internal drive, where the operation did not complete. In both scenarios, entries in the bitmap on the remote disk drive indicate those blocks of the remote disk drive which have not been copied back to the internal disk drive.

The fourth LVM state is the EMERGENCY operating state. Here, the PC has a connection only to the remote disk drive. This is an operating situation in which the internal disk drive has crashed or is otherwise inoperable, but nonetheless the user continues to use the PC. The bitmap on the remote disk drive reflects blocks that have been written during this state of operation.

FIG. 7 shows an example of a boot order table 0701. This table indicates search order of the drives to find the bootstrap code. The PC can have multiple storage devices on which the bootstrap code can reside. Each entry in this table shows which storage devices the BIOS can look in, and in which order. Thus, the priority field 070101 dictates the search order. The drive field 070103 indicates the data storage device. Typically, the BIOS allows a user to specify the search order.

Following will be a discussion of the operation of the PC and its components according to a particular embodiment of the invention. First, an explanation of a boot-up process will be discussed. Generally, when the PC is powered up, the BIOS of the PC reads the bootstrap code from the disk drive, selected in accordance with the boot order table 0701. In this particular implementation of the present invention, there is an internal disk drive 010109 and the remote disk drive 010105. The BIOS code according to the invention determines which disk drives are available. There are four cases to consider (see FIG. 8):

case A (0807) the internal disk drive and the remote disk drive are both available case B (0809) the internal disk drive, only, is available case C (0815) the remote disk drive, only, is available case D (0817) no disk drive is available FIG. 8 shows the BIOS processing in accordance with a particular embodiment of the invention. The BIOS is executed in a step 0801 when the PC is turned on. The BIOS determines by known disk I/O techniques if the internal disk drive is available, in a step 0803. The BIOS then determines if the remote disk drive is available, in steps 0805 and 0811. If both the internal disk drive and the remote disk drive are available, then the BIOS records that the situation is case A, in a step 0807. If only the internal disk drive is available, then the BIOS records the situation as case B, in a step 0809. If only the remote disk drive is available, then the situation is noted as case C, in a step 0815. If neither disk drive is available, a standard error message is displayed, in a step 0813, and the process halts (step 0817).

FIG. 9 shows a high level flow chart of bootstrap loading and LVM processing to determine the LVM operating status in the case A, where both the internal disk drive and the remote disk drive are accessible. The bootstrap code is read in a step 0903 from the disk drive as determined by the boot order table, and is executed. The boot order table should be set to the boot order which reflects the current situation of the PC in terms of availability of internal and remote disk drives. Typically, the internal disk drive will be the highest priority. However where the internal drive has been recently replaced as, for example, in the case of a crashed drive, then the remote disk drive should be set in the boot order table as the highest priority drive.

In a step 0905, the bootstrap code reads the LVM superblock 030103 from the boot drive (i.e., that disk drive from which the bootstrap code was read). In a step 0907, the LVM mode 040103 is read from the LVM superblock and checked. If the mode is Normal, then in a step 0909 the LVM status 0601 is set to OFFICE and the kernel is read in from the internal disk drive, in a step 0911. If the mode is Recovery, then in a step 0915, the LVM status is set to RECOVERY and the kernel is read in from the remote disk drive in step 0911.

In the case, where the internal disk drive is a replacement drive, the LVM superblock will not be present. In that case, the bootstrap code will fail in its attempt to access the LVM superblock. The bootstrap code will set the LVM mode to Recovery when it fails to detect a valid LVM superblock on the internal disk drive, in a step 0913. In addition, all the flags of the bitmap in the remote disk drive are set to "1", in a step 0915. Then the LVM status is set to RECOVERY in step 0917 and the kernel code is read from the remote disk in step 0919.

The OS then begins to boot up, in a step 0921. Processing of the boot up sequence of the OS is discussed below.

FIG. 10 shows a high level flow chart of bootstrap loading and LVM processing to determine the LVM operating status in the case B, where only the internal disk drive is accessible. The BIOS reads in the bootstrap code from the internal disk drive, in a step 1003. The bootstrap code reads the LVM superblock from the internal disk drive, in a step 1005. The LVM mode is read from the superblock and checked, in a step 1007. If the mode is Normal, then in a step 1009 the LVM status is set to HOME and the kernel code is read in and executed, in a step 1011. The OS begins its boot-up processing in step 0921, which is discussed below. If the mode is Recovery, or the internal disk drive has no detectable valid LVM superblock, then the user is informed that the PC cannot boot from the internal drive, in a step 1015. Recall, that Recovery mode requires booting from a remote disk drive. However in this case B, there is no remote disk drive; and though the internal disk drive is readable, if there is no LVM superblock, then the internal drive is deemed to be a newly installed drive, and again the PC cannot boot.

FIG. 11 shows a high level flow chart of bootstrap loading and LVM processing to determine the LVM operating status in the case C, where only the remote disk drive is accessible. The BIOS reads in the bootstrap code from the remote disk drive, in a step 1103. In a step 1105 the LVM status is set to EMERGENCY. The kernel code is read in from the remote disk drive in a step 1107 and the OS begins booting in step 0921.

FIG. 12 shows high level processing of the boot sequence of an OS in accordance with a particular embodiment of the invention. In a step 1203, the OS initializes the hardware and all the software components of the OS to bring up the various OS services. This step is conventional and well known. In addition to this conventional processing, the OS initializes the LVM software component, in a step 1205. After the LVM component is initialized, the LVM component is ready to provide access of a logical disk drive to the OS. Thus, in a step 1207, the OS mounts the logical disk drive. The OS may then perform some final initializations in a step 1209. At this point, the boot up sequence is complete.

FIG. 13 shows a high level diagram of a shutdown procedure for the OS. All of the applications and OS services are shutdown in a proper manner, in a step 1303. The logical disk drive is then unmounted, in a step 1305. Next, in a step 1307 an LVM shutdown procedure is called. Any remaining shutdown steps are then performed in a step 1309, after which the PC can be turned off.

FIG. 14 is a high level flow chart showing the processing of the initialization of the LVM software component. First, the LVM component determines the LVM status, in a step 1403. If the status is OFFICE, then a runtime bitmap is created in the memory 010103 by loading the bitmap stored on the internal disk drive, in a step 1405. Next, in a step 1407 a sync agent daemon is initiated. If the status is HOME, then in a step 1409 the runtime bitmap is simply read into memory from the bitmap stored on the internal disk drive. If the status is RECOVERY, then the runtime bitmap is loaded into memory from the bitmap stored on the remote disk drive in a step 1411 and the sync agent daemon is initiated, in a step 1413. If the status is EMERGENCY, then the runtime bitmap is simply read from the bitmap on the remote disk drive, in a step 1415. Finally, an I/O agent daemon is initiated, in a step 1417.

FIG. 15 shows the high level processing steps of the LVM shutdown procedure. In the case where the LVM status is OFFICE, then LVM waits for the runtime bitmap to be cleared by the sync agent daemon, in a step 1505. The processing of the sync agent daemon will be explained below. The runtime bitmap, which is cleared now, is then copied back, in a step 1507, to the bitmaps stored on the internal disk drive and on the remote disk drive. This situation indicates that both disk drives are the same. The LVM mode in the superblock of both the internal disk drive and the remote disk drive is set to Normal, in a step 1509. Finally, in a step 1521 the sync agent daemon and the I/O agent daemon are stopped.

If the status is HOME, then the LVM module simply writes the runtime bitmap back to the internal disk drive. The LVM in the superblock of the internal disk drive is set to Normal, in a step 1513. Finally, the sync agent and I/O agent daemons are stopped in step 1521.

If the status is RECOVERY, then the LVM makes a determination as to the amount of time required to copy all of the data from the remote disk drive to the internal disk drive and thus clear the bitmap, in a step 1515. If the time-to-copy exceeds a predetermined threshold, then the sync agent daemon is halted. The runtime bitmap is simply copied to the remote disk drive, in a step 1517. Also, the LVM mode of the superblock in both the internal disk drive and the remote disk drive is set to Recovery. The sync and I/O daemons are then stopped in a step 1521. If the time-to-copy falls below the threshold, then processing proceeds through steps 1505 to 1509 and then to step 1521.

If the status is EMERGENCY, then the bitmap is simply written back to the remote disk drive in step 1517. The LVM mode in the superblock of both the internal and remote disk drives is set to RECOVERY. In step 1521, the sync and I/O daemons are halted.

FIG. 18 shows a high level flow chart of I/O agent daemon processing. The I/O agent receives data I/O requests from the file system to read and write data with the logical disk drive in a step 1803. The type of I/O request is determined, in a step 1805. If the request is a write request, then a write sequence operation is performed, in a step 1807. The result of the write operation is returned to the file system in step 1811. If the request is a read operation, then a read sequence operation is performed in a step 1809, after which the result of the read operation is returned to the file system.

FIG. 16 shows a high level flow chart of a write sequence process in accordance with a particular embodiment of the present invention. The LVM status is checked in step 1603. If the status is OFFICE or HOME, then data is written to the internal disk drive, in a step 1605. In a step 1609 the entry in the runtime bitmap (which was read into memory from the internal disk drive during LVM initialization, see FIG. 14) corresponding to the block that was written is set to "1". As discussed above, a "1" in an entry of the bitmap on the internal disk drive indicates that the corresponding block on the internal disk drive is to be copied to the remote disk drive.

If the status is RECOVERY or EMERGENCY, then the data is written to the remote disk drive, in a step 1607. Then in step 1609, the entry in the runtime bitmap (which was read into memory from the remote disk drive during LVM initialization, see FIG. 14) corresponding to the block that was written is set to "1". As discussed above, a "1" in an entry of the bitmap on the remote disk drive indicates that the corresponding block on the remote disk drive is to be copied to the internal disk drive.

FIG. 17 shows a high level flow chart of a read sequence process in accordance with a particular embodiment of the present invention. If the LVM status is OFFICE or HOME, then data is read from the internal drive, in a step 1705. If the LVM status is RECOVERY or EMERGENCY, then a check of the runtime bitmap (copied from the remote disk drive) is made, in a step 1707. If the entry corresponding to the block to be read is not set to "1", then the read request is fulfilled by reading the block from the internal disk drive, step 1705. On the other hand, if the entry is set to "1", then the block is read from the remote disk drive, in a step 1709.

The reason for reading from the remote disk drive in the case where the entry is "1" is that there is a chance that the remote data block has not yet been copied to the corresponding internal disk drive data block.

FIG. 19 shows a high level flow chart of the processing that is performed by the sync agent daemon in accordance with a particular embodiment of the present invention. The sync agent takes no action until a "1" is written to an entry in the runtime bitmap (step 1903). When a "1" is written to an entry in the bitmap, the sync agent checks the LVM status, in a step 1905. If the status is OFFICE or HOME, then the corresponding block on the internal disk drive is read in a step 1907 and written to on a corresponding block on the remote disk drive, in a step 1909. Then, the entry is cleared (set to a value other than "1"), in a step 1915.

If the LVM status is RECOVERY or EMERGENCY, then the corresponding block on the remote disk drive is read in a step 1911 and written to on a corresponding block on the internal disk drive, in a step 1913. Then, the entry is cleared (set to a value other than "1"), in step 1915.

The sync daemon and the I/O daemon are separate processes, executing independently of each other. Consequently, the sync daemon copies data between the internal drive and the remote drive asynchronously with respect to the I/O requests that sent to the I/O daemon.

It can be appreciated that the specific arrangement which has been described is merely illustrative of one implementation of an embodiment according to the principles of the invention. Numerous modifications may be made by those skilled in the art without departing from the true spirit and scope of the invention as set forth in the following claims.

What is claimed is:

1. In a personal computing (PC) device, a method for data backup comprising:
   receiving one or more I/O (input/output) requests;
   determining, between a local data storage device and a remote data storage device, whether one or the other is accessible;
   if said local storage device is accessible, then:
      exchanging information with said local data storage device according to said I/O requests, including storing some of said information on one or more data blocks of said local data storage device;
      for each of said one or more data blocks which is updated, setting an entry in a first runtime bitmap to a first value, said first runtime bitmap having an entry corresponding to each of a plurality of data blocks which comprise said local data storage device; and
      for each entry in said runtime bitmap that is set to said first value, performing a copy operation of data from said local data storage device to said remote data storage device and clearing said each entry, said copy operation being performed asynchronously with respect to said receiving one or more I/O requests; and
   if said local storage device is inaccessible, then:
      exchanging said information with said remote data storage device according to said I/O requests, including storing some of said information on one or more data blocks of said remote data storage device;
      for each of said one or more data blocks which is updated, setting an entry in a second runtime bitmap to said first value, said second runtime bitmap having an entry corresponding to each of a plurality of data blocks which comprise said remote data storage device; and
      for each entry in said second runtime bitmap that is set to said first value, performing a copy operation of data from said remote data storage device to said local data storage device after said local storage device is accessible and clearing said each entry, said copy operation being performed asynchronously with respect to said receiving one or more I/O requests,
   wherein a subsequent copy operation is performed to copy data from first one of said two data storage devices to the other of said two data storage devices based on said runtime bitmap of said first one of said two data storage devices.

2. The method of claim 1 further comprising receiving a shutdown request and in response thereto, wherein if said local data storage device is accessible, then copying data blocks from said local data storage device to said remote data storage device, for each corresponding entry in said first runtime bitmap that is set to said first value.

3. A computer program product for data backup, the computer program executing on a processor, the processor operable to communicate with a local data storage device and to communicate with a remote data storage device, the computer program comprising program code to cause the processor to perform method steps recited in claim 1.

4. In a personal computing (PC) device, a method for data backup comprising:
   receiving one or more I/O (input/output) requests;
   exchanging information with a first data storage device according to said I/O requests, including storing some of said information on one or more data blocks of said first data storage device;
   for each of said one or more data blocks, setting an entry in a runtime bitmap to a first value, said runtime bitmap having an entry corresponding each of a plurality of data blocks which comprise said first data storage device;
   for each entry in said runtime bitmap that is set to said first value, performing a copy operation of data from said first data storage device to a second data storage device, and clearing said each entry, said copy operation being performed asynchronously with respect to said receiving one or more I/O requests; and
   receiving a shutdown request and in response thereto:
      copying data blocks from said first data storage device to said second data storage device, for each corresponding entry in said runtime bitmap that is set to said first value, if said first data storage device is an internal disk drive and said second data storage device is a remote disk drive; and
      copying said runtime bitmap to said first data storage device if said first data storage device is a remote disk drive and said second data storage device is an internal disk drive, and if a time-to-copy exceeds a threshold time value, said time-to-copy being the time required to copy data blocks from said remote disk drive device to said internal disk drive for each corresponding entry in said runtime bitmap that is set to said first value.

5. A method for data backup and recovery in a personal computer (PC) comprising:
   determining whether an internal disk drive is available, said internal disk drive having a bitmap stored thereon;
   determining whether a remote disk drive is available, said remote disk drive having a bitmap stored thereon;
   if said internal disk drive and said remote disk drive are available, then:
      accessing first information from said internal disk drive;

if said first information is indicative of a first mode, then setting a status to indicate a first state of operation;

if said first information is indicative of a second mode, then setting said status to indicate a second state of operation; and if said first information cannot be accessed from said internal disk drive, then setting all entries in said bitmap stored on said remote disk drive to a first state and setting said status to indicate said second state of operation;

if said internal disk drive is available and said remote disk drive is not available, then:

accessing first information from said internal disk drive;

if said first information is indicative of a first mode, then setting a status to indicate a third state of operation; and if said first information is indicative of said second mode or if said first information cannot be accessed from said internal disk, then halting operation of said PC; and if said remote disk drive is available and said internal disk drive is not available, then setting said status to indicate a fourth state of operation, wherein said bitmap of said internal disk drive or said bitmap of said remote disk drive is loaded as a runtime bitmap into a memory of said PC, depending on said status, wherein entries in said runtime bitmap are set to a first value during write operations, wherein data blocks are copied between said internal disk drive and said remote disk drive based on contents of said runtime bitmap and on said status, thereby effecting backup and recovery of data.

6. The method of claim 5 wherein said steps of determining are based on contents of a boot order table.

7. The method of claim 5 further including receiving a shutdown request, and in response thereto:

(i) if said status is indicative of said first state of operation, then copying data blocks from said internal disk drive to said remote disk drive based on contents of said runtime bitmap, clearing said runtime bitmap, storing said runtime bitmap onto said internal disk drive and said remote disk drive, and setting said first information on both of said internal disk drive and said remote disk drive to be indicative of said first mode;

(ii) if said status is indicative of said third state of operation, then copying said runtime bitmap to said internal disk drive;

(iii) if said status is indicative of said second state of operation, then:

(A) determining a time to copy data blocks from said remote disk drive to said internal disk drive and if said time does not exceed a threshold value then performing said substep (i); and (B) if said time exceeds said threshold value then copying said runtime bitmap to said remote disk drive and setting said first information on both said internal disk drive and said remote disk drive to be indicative of said second mode; and (iv) if said status is indicative of said fourth state of operation, then performing said steps of copying and setting as recited in said step (iii)(B).

8. A personal computing (PC) device comprising: first circuitry operable for data input and output with an internal disk drive; second circuitry configured for data input and output with a remote disk drive; and a basic input and output system operating in accordance with the method of claim 5.

9. A method for data backup and recovery in a personal computer (PC) comprising:

determining whether an internal disk drive is available, said internal disk drive having a bitmap stored thereon;

determining whether a remote disk drive is available, said remote disk drive having a bitmap stored thereon;

if said internal disk drive and said remote disk drive are available, then:

accessing first information from said internal disk drive;

if said first information is indicative of a first mode, then setting a status to indicate a first state of operation;

if said first information is indicative of a second mode, then setting said status to indicate a second state of operation; and if said first information cannot be accessed from said internal disk drive, then setting all entries in said bitmap stored on said remote disk drive to a first state and setting said status to indicate said second state of operation; and if said internal disk drive is available and said remote disk drive is not available, then:

accessing first information from said internal disk drive;

if said first information is indicative of a first mode, then setting a status to indicate a third state of operation; and if said first information is indicative of said second mode or if said first information cannot be accessed from said internal disk, then halting operation of said PC;

wherein said bitmap of said internal disk drive or said bitmap of said remote disk drive is loaded as a runtime bitmap into a memory of said PC, depending on said status, wherein entries in said runtime bitmap are set to a first value during write operations, wherein data blocks are copied between said internal disk drive and said remote disk drive based on contents of said runtime bitmap and on said status, thereby effecting backup and recovery of data.

10. The method of claim 9 wherein said steps of determining are based on contents of a boot order table.

* * * * *